(12) United States Patent
Forchino

(10) Patent No.: US 7,640,875 B2
(45) Date of Patent: Jan. 5, 2010

(54) CUTTING DISK SYSTEM FOR SEEDING MACHINES

(76) Inventor: Elvio Antonio Forchino, 967 Paso de los Andes Street, Santa Fe City (Santa Fe) (AR)

(*) Notice: Subject to any disclaimer, the term of this patent is extended or adjusted under 35 U.S.C. 154(b) by 0 days.

(21) Appl. No.: 12/117,199

(22) Filed: May 8, 2008

(65) Prior Publication Data

US 2008/0276847 A1 Nov. 13, 2008

(30) Foreign Application Priority Data

May 9, 2007 (AR) ............... P20070102019

(51) Int. Cl.
- *A01B 49/04* (2006.01)
- *A01B 61/00* (2006.01)
- *A01C 5/00* (2006.01)
- *A01C 13/00* (2006.01)
- *A01C 15/00* (2006.01)

(52) U.S. Cl. ............ 111/140; 111/143; 111/163; 111/193; 111/200; 111/926; 111/927; 172/264

(58) Field of Classification Search .......... 111/149, 111/158, 163–169, 139–143, 190–196, 120, 111/121, 200, 926, 927; 172/4, 518, 567–569, 172/574–604, 776, 261–268
See application file for complete search history.

(56) References Cited

U.S. PATENT DOCUMENTS

| 4,519,325 A * | 5/1985 | Miller ............... 111/164 |
| 5,782,307 A * | 7/1998 | Forsyth .............. 172/156 |
| 2007/0089653 A1* | 4/2007 | Wendte et al. ......... 111/136 |

* cited by examiner

*Primary Examiner*—Christopher J. Novosad
(74) *Attorney, Agent, or Firm*—Lucas & Mercanti, LLP

(57) ABSTRACT

A disc system for an agricultural machine including a frame carrying a plurality of agricultural tools, the disc system comprising a leading disc mounting mechanism and a rear tools mounting mechanism, wherein the mechanisms are mounted in the frame in a manner that they move in upward and downward directions and when one of the mechanisms tends to move in one of the directions the other one of the mechanisms tends to move in the opposite direction to copy as close as possible the field profile.

4 Claims, 1 Drawing Sheet

CUTTING DISK SYSTEM FOR SEEDING MACHINES

BACKGROUND OF THE INVENTION

1. Field of the Invention

The present invention relates to the field of the agricultural machines and more particularly refers to a seeding machine with a cutting disc or coulter for cutting the stubble remaining on the soil and even more particularly the invention refers to a new system for mounting the coulter in a minimum tillage or no tillage machine in a manner to improve the cutting effect of the coulter on the stubble and harvest leftovers which remain in the field, ahead of the planting unit, by keeping a uniform and constant penetration of the coulter into the soil along the seeding path.

2. Description of the Prior Art

The increasing concern of the environment was, among other questions, one of the points that driven new technologies for agricultural seeding methods that were replacing the traditional row crop farming. Minimum tillage or non tillage farming equipments employs many implements capable of performing multiple functions simultaneously. No tillage farming equipments have been in use for decades and many improvements have been and are constantly implemented for better results.

A seeding machine generally comprises a frame upon which a plurality of ground working implements or tools are mounted to till and plant row crops in one pass of the field. The machine employs a plurality of planting units, one for each line of crops or furrows and the tools are arranged serially one behind the other in the direction of travel of the machine. For example, counter means are arranged at the front of the frame to split and slice the untilled ground directly in front of the planter unit travelling behind. Once the stubble and rests of old crops remaining on the field is cut and open, the planter unit forms a furrow, deposits the seeds and covers up the seeds. The planter units is provided with furrow opening discs conveniently associated to some kind of seed supplier such as a seed tube or conduit, compacting wheels for compacting the soil at the sides of the furrow and finally closing wheels to cover up the seeds with loose soil. Other implements may be included for applying fertilizers, for example.

The general array of planter units will vary depending on the machine manufacturer, services, kind of crops, soils, etc. but generally all of them needs of a leading coulter or cutting disc for split and slicing the stubble. This leading coulter is a cutting disc that is rotatably mounted in a support in front of the planter unit generally by means of a pivoting mechanism, such as a deformable parallelogram whereby the disc may move up and down for copying, as much as possible, the irregularities and profile of the field. For exerting a downward force on the disc to guarantee a correct split and slice of the material remaining over the field, one or more springs are provided pushing the mechanism downwardly into the laying material or stubble and a surface of the soil. A release latch or similar lock is also provided to release the force on the disc when a solid obstacle is found in the disc path.

There is a variety of improvements in the art for mounting the tools and coulters, by different pivoting mounts that actuates on the coulter to make it copy the filed profile. Some of the alternatives employ one or more springs and pneumatic chambers to urge the coulter against the field. In addition, the provision of pneumatic chambers needs of additional room and installations for connections and operation.

However, the fields that is being worked is generally irregular and the planter unit, the tools in general, and particularly the coulter, can not keep a uniform deep, in the split of the stubble and furrow because the coulter my be in a level of the field above the level where the planter unit is working. The result of this uneven position of the equipment is that the coulter may be travelling deep under the surface of the soil while the planter unit has the tools thereof, such as the furrow opening discs, at a swallow furrow insufficient to provide a good covering for the seed. Generally, if the leading coulter finds a higher field level tends to lift all the equipment, including the planter unit.

Another effect on the coulter is that the force that urges the same into the stubble and slightly into the soil is also comprised of the weigh of the seed box, therefore when the box is full of seeds a good weight is transferred to the coulter mount but this weight may be insufficient when the box has a small amount of seeds. Hence, the coulter actuates only under the force of the springs.

Considering the above drawbacks of the prior art equipment, it would be very desirable and convenient to have a system for mounting a coulter in a seeding machine that may be combined with mounting of the planter unit in a manner that the force urging the coulter into the soil is affected by the position of the planter unit.

SUMMARY OF THE INVENTION

It is therefore an object of the invention to provide a new system for mounting farm tools in a farming machine, wherein the tools may follow the field profile and maintain a uniform work independently of the profile.

It is a further object of the present invention to provide a new system for mounting and urging a coulter in a seeding machine by associating any vertical movement of the coulter to vertical movement of a planter unit in the machine.

It is still another object of the present invention to provide a disc mount system for an agricultural machine including a frame or tool bar carrying a plurality of agricultural tools, the disc system comprising a leading disc mounting mechanism and a rear tools mounting mechanism, wherein the mechanisms are mounted in the frame or tool bar in a manner that they move in upward and downward directions and when one of the mechanisms tends to move in one of the directions the other one of the mechanisms tends to move in the opposite direction to copy as close as possible the profile or a field upon which the machine is traveling.

It is another object of the present invention to provide a system for mounting and urging a coulter against the soil with the system providing a cinematic connection of the disc with the planter unit of a seeding machine whereby the planter unit and the coulter uniformly follows the profile of a field upon which the machine is travelling.

It is even a further object of the present invention to provide a disc mount system for an agricultural machine, wherein the machine includes a frame carrying a plurality of agricultural tools, the disc system comprising:

a leading disc mounting mechanism pivotally mounted in the frame for moving up and down, a rear tools mounting mechanism pivotally mounted in the frame for moving up and down, and an antagonist mechanism in the frame for moving the leading disc mounting mechanism down when the rear tools mounting mechanism is moving up, and for moving the leading disc mounting mechanism up when the rear tools mounting mechanism is moving down.

The above and other objects, features and advantages of this invention will be better understood when taken in connection with the accompanying drawings and. description.

BRIEF DESCRIPTION OF THE DRAWINGS

The present invention is illustrated by way of example in the following drawings wherein.

DESCRIPTION OF THE PREFERRED EMBODIMENTS

Figure 1:
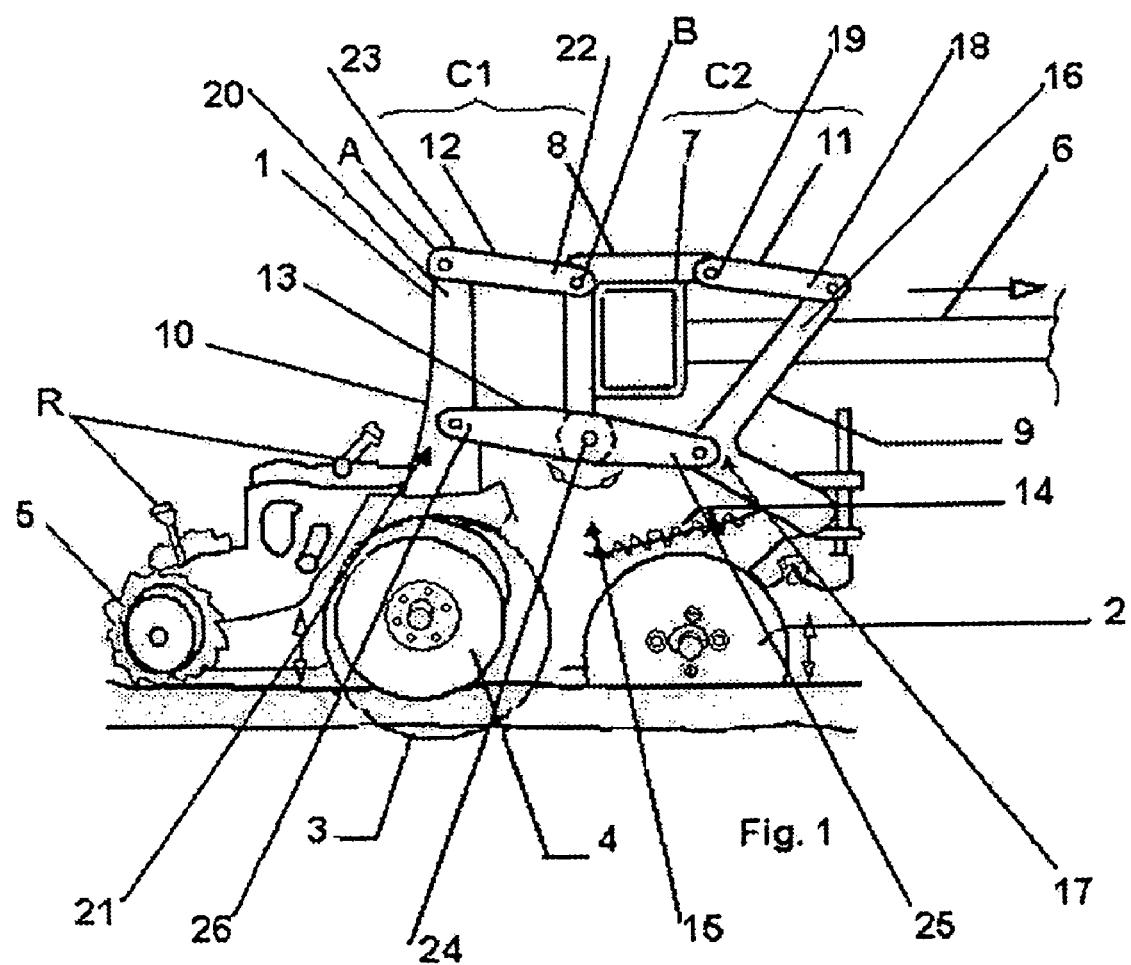
FIG. 1 shows an elevation side view of planter unit and coulter according to the teachings of the present invention.

Now referring in detail to the invention, the same refers to an agricultural machine and more particularly, but not restricted to this, a seeding machine and even more preferably to a no tillage seeding machine. The non till farming requires of series of simultaneous works or functions to deposit, in proper conditions, the seed into the soil and cover up the same as required. A typical function that must be performed in a non till seeding is to split, cut or slice the stubble or harvest leftovers which remain in the field, ahead of the planting unit when the seeding machine is traveling. This function is generally carried out by cutting disc or blade, preferably a rotary disc, known as coulter, which may be curved, flat or wavy. Any kind of coulter or disc may be employed with the teachings of the present invention which provide an enhanced balance and force upon the coulter in a manner that the coulter keeps a regular and uniform deep into the stubble or soil independently of the irregularities of the soil or field profile.

According to the present invention, illustrated in FIG. 1, the seeding machine includes a seeding assembly 1 including a leading cutting disc or coulter 2 for splitting, cutting and slicing the stubble or harvest leftovers that remain in the field. The coulter travels ahead of the seeding assembly and all of the implements or tools forming part thereof. More particularly, the coulter leads the assembly by travelling ahead of the planter unit that includes one or two furrow opening discs 3 for opening a furrow with a deep enough to receive the seed, at least one level wheel 4 to keep the disc into the soil under a deepness as uniform as possible, and closing wheels 5 for covering up the furrow and seeds with loose soil. Wheels 4 may operate also as compacting wheels to compact the soil at the sides of the furrow and have a large rolling surface to rest onto the field in a manner to keep the disc or discs 3 into the soil at a desired and uniform level or deepness. The furrow opener discs 3 are generally associated to a tube, not illustrated, for discharging the seeds into the furrow. Other implements, for applying fertilizers, for example, may be also provided as it is well known in the art. All these implements are associated. to control, adjusting or regulating means, generally indicated by "R", to place the corresponding implement on the desired position, to regulate the working tension or force thereof, and to control relative position and coordination between the coulter, the compacting wheels, the closing wheels, etc.

As it was described in connection to the prior art, while the operation of an implement may be regulated according to the operation of another implement, the extent of the introduction of the furrow opening disc or discs into the soil and the extent of introduction of the coulter into the stubble, and even partially into the soil, are not correlated. There is no link between the forces that urges the furrow disc and the coulter downwardly.

According to the invention, a link, preferably a cinematic link, and most preferably a mechanical link, is provided between the mechanism for mounting the coulter and the mechanism upon which the implements of the planter unit are mounted. The invention provides the means for urging the coulter to enter into the stubble, or the soil, to cut, to split or to slice the stubble or harvest leftovers, wherein the force urging the coulter varies according to the field profile and surface irregularities in order to enhance the cutting effect of the coulter and to keep the cutting edge of the coulter at a uniform and regular deepness into the stubble or eventually also into the soil.

The entire seeding implements are pulled or towed, as indicated by the arrow to the right hand side in the FIGURE, to travel along the field by means of a tow bar 6 that may be connected to a vehicle such as a farm tractor, not illustrated. The tow bar is connected to a tool bar 7 upon which a plurality of seeding assemblies, like the one illustrated in the FIGURE, are mounted and arranged side by side and properly spaced apart to define the parallel rows of the crop to be planted with the pass of the seeding machine.

Tool bar 7 preferably includes a support bracket 8 for connecting, according to the teachings of the invention, at least part of the implements of the seeding assembly. Bracket 8 preferably comprises a couple of L-shaped plates, only one of which is illustrated, which are fixed together parallel to each other at a small distance and, if desired, reinforced by transverse spacer ribs, not shown, in a manner that the bracket is a resistant piece that is firmly affixed to the tool bar as shown in the FIGURE, by welding, for example.

According to the teachings of the invention, the leading cutting disc or coulter forms part of an inventive disc system comprising a leading disc mounting mechanism, generally indicated by bracket C2, which is pivotally mounted in frame 8 for moving up and down, and a rear tools mounting mechanism, indicated under bracket C1, pivotally mounted in the frame also for moving up and down, and an antagonist mechanism 15 in the frame for moving or urging the leading disc mounting mechanism down when the rear tools mounting mechanism is moving or urged up, and for moving or urging the leading disc mounting mechanism up when the rear tools mounting mechanism is moving or urged down.

The leading disc mounting mechanism C2 comprises leading cutting disc or coulter 2 which is rotatably mounted in a leading disc support 9 having a L-shape as illustrated and an upper connecting portion 16 and a lower connecting portion 17, and a leading upper arm 11 having a Reading end 18 pivotally connected to upper connecting portion 16 of leading support 9 and a rear end 19 pivotally connected to frame 7, preferably through bracket 8.

The rear tools mounting mechanism C1 comprises a rear tools support 10 having an upper connecting portion 20 and a lower connecting portion 21, and a rear upper arm 12 having a leading end 22, pivotally connected to the frame and a rear end 23 pivotally connected to upper connecting portion 20 of rear tools support 10.

According to a preferred embodiment of the invention, the antagonist mechanism comprises a rocker arm 13 having a mid portion 24 pivotally connected to the frame, through bracket 8, and a leading end 25 pivotally connected to lower connecting portion 17 of leading disc support 9 of leading disc mounting mechanism C2 and a rear end 26 pivotally connected to lower connecting portion 21 of rear tools support 10 of rear tools mounting mechanism C1.

The plurality of agricultural tools or implements of the machine is preferably mounted in the lower connecting portion of rear tools support 10, except for the leading cutting disc or coulter 2 that is mounted in leading mechanism C2. The plurality of agricultural tools mounted in the rear tools support is generally named planting unit or planter unit and includes the furrow opener disc or discs 3, the level or compacting wheel or wheels 4 and the closing wheels or discs 5.

While arms 11, 12 and 13 are connected to bracket 8, it is considered that frame 7 can have connecting ears or any other connecting portions for connecting arms 11, 12 and 13 without having bracket 8. All the pivoting connections between the arms, support and bracket may be of any suitable kind such as a bolt-and-nut connection to permit the mechanisms move up and down and around frame 7. For clarity purposes only the pivoting connections of arms 12 have been indicated by letter references A and B but the remaining ones may be of the same type.

Preferably, coulter 2 is mounted in the leading mechanism C2 under the load or urging resilient effect of a spring 14 and it may include any type of releasing lock to permit the coulter to yield upon a stone or any other solid obstacle that could damage the coulter and mechanisms.

Leading mechanism C2, together with coulter 2 may move up and down and slightly around frame 7 because of the pivoting connection of arm 11 to frame 7, and pivoting connection between support 9 and rocker arm 13 also pivoting at portion 24 in frame 7. In like manner, rear mechanism C1, together with implements 3, 4, 5, also may move up and down and slightly around frame 7 because of the pivoting connection of arm 12 to frame 7, and pivoting connection between rear support 10 and rocker arm 13. Rocker arm 8, as illustrated, has a middle portion 24 thereof pivotally connected to frame 7 by bracket 3 and may move with a tilting or rocking capacity around the pivoting region in the frame. Thus, leading end 25 and rear end 26 of rocker arm 13 my move up and down alternatively.

Since both rear and leading mechanisms C1 and C2 are articulated to the frame but they share the connection with rocker arm 13, this rocker arm actuates as an antagonist mechanism in a manner that the movements of mechanisms C1 and C2 are correlated in an up and down inverse pattern. In other words, when the leading disc mounting mechanism tends to move down, the rear tools mounting mechanism tends to move up, and, vice versa, when the leading disc mounting mechanism tends to move up, the rear tools mounting mechanism tends to move down.

Taking into consideration that the leveling wheel or wheels 4 travels on the soil surface with a large surface of the wheel being in contact with the soil surface, the wheel is capable of keeping the deep of disc 3 constant into the soil because it would be necessary an extreme downwardly actuating force to move wheels 4 into the soil down the field surface. Therefore, when leading cutting disc or coulter 2 finds a hard, solid or compacted stubble and harvest leftovers, this material remaining on the field will tend to move or urge coulter 2 upwardly. This upward urging or movement of disc 2, will move mechanism C2 upwardly and, through rocker arm 13, mechanism C1 will be forced to move downwardly. Since wheels 4 offer an important resistance to downward movement, mechanism C1 will resist the upward movement of mechanism C2 and will keep mechanism C2 and coulter 2 forced against stubble to cut and split it as necessary. This is also a beneficial effect over the leveling wheel as long as the same will remain urged against the field surface thus preventing bounces and vibrations thereof.

Under an inverse effect, when wheel 4 travels on a level higher than the standard level of the field profile, mechanism C1 will move upwardly and will force coulter 2 to move downwardly, thus preventing coulter 2 from being lifted under the effect of the planter unit traveling at a higher level.

The antagonist effect between leading mechanism C2 and rear mechanism C1 will be kept always effective independently from the amount of seeds into the seed box. This antagonist effect operates satisfactorily to make the implements of the planter unit and coulter copy the surface and irregularities of the field.

Preferably, each arm 11, 12 and 13 comprises a pair of metal plates joined together but spaced apart a distance enough to permit their pivoting connection with supports 9 and 10. Thus, each support 9 and 10 may comprise a plate that is connected between the two plates conforming arms 11, 12 and 13.

As indicated above, while only pivoting connections A and B have been shown for arm 12, all the remaining connections between arms 11, 13 and supports 9 and 10 and frame or bracket 8 may be of the same type, for example, each one may comprise a bearing, a bushing or bearing connection, or simply an sleeve with a bolt and nut or pin passing through the connected arms and supports. In addition, the implements of rear mechanism C1, namely, closing wheel(s) 5, level or compacting wheel (s) 4 and furrow opener disc(s) 3, will be mounted in a manner that they move up and down with mechanism C1 but rotation thereof relative to the field surface will be prevented.

While preferred embodiments of the present invention have been illustrated and described, it will be obvious to those skilled in the art that various changes and modifications may be made therein without departing from the scope of the invention as defined in the appended claims.

I claim:

1. A seeding agricultural machine, wherein the machine includes at least one tool bar, a plurality of seeding assemblies mounted in the tool bar and at least one tow bar connected to the at least one tool bar and connectable to a tractor, the seeding assemblies include a rear planter unit and at least one leading cutting disc, wherein the machine comprises:

a leading disc mounting mechanism pivotally mounted in a frame for moving up and down and including a leading disc support, with the leading cutting disc being mounted in the leading disc support, the leading disc support having an upper connecting portion and a lower connecting portion;

a rear tools mounting mechanism pivotally mounted in the frame for moving up and down and including a rear tools support, with the rear planter unit being mounted in the rear tools support, the rear tools support having an upper connecting portion and a lower connecting portion;

an antagonist mechanism in the frame for urging the leading disc mounting mechanism down when the rear tools mounting mechanism is urged up, and for urging the leading disc mounting mechanism up when the rear tools mounting mechanism is urged down;

a leading upper arm having a leading end pivotally connected to the upper connecting portion of the leading support and a rear end pivotally connected to the tool bar;

a rear upper arm having a leading end pivotally connected to the tool bar and a rear end pivotally connected to the upper connecting portion of the rear tools support; and, wherein the leading upper arm extends at a leading side of the tool bar and the rear upper arm extends at a rear side of the tool bar, with the antagonist mechanism pivotally mounted in the tool bar.

2. The machine of claim 1, wherein:

the antagonist mechanism comprises:

a rocker arm pivotally connected to the tool bar having a leading end connected to the tool bar and having a leading end connected to the rear tools mounting mechanism.

3. The machine of claim 2, wherein:

the rocker arm has a mid portion pivotally connected to the tool bar with the leading end of the rocker arm being pivotally connected to the lower connecting portion of the leading disc support and the rear end of the rocker arm being pivotally connected to the lower connecting portion of the rear tools support.

4. The disc system of claim 3, wherein:

the leading cutting disc is a sharpened coulter for cutting stubble and harvest leftovers which remain in a field, ahead of a planting unit.

\* \* \* \* \*